United States Patent
Kaushik et al.

(10) Patent No.: US 10,123,190 B2
(45) Date of Patent: Nov. 6, 2018

(54) SYSTEM AND METHOD FOR TESTING A COAP SERVER

(71) Applicant: HCL Technologies Limited, Noida, Uttar Pradesh (IN)

(72) Inventors: Aashish Kaushik, Uttar Pradesh (IN); Saurabh Sharda, Uttar Pradesh (IN); Mukta Agarwal, Uttar Pradesh (IN)

(73) Assignee: HCL Technologies Limited, Noida (IN)

( * ) Notice: Subject to any disclaimer, the term of this patent is extended or adjusted under 35 U.S.C. 154(b) by 204 days.

(21) Appl. No.: 15/079,583

(22) Filed: Mar. 24, 2016

(65) Prior Publication Data
US 2016/0337216 A1  Nov. 17, 2016

(30) Foreign Application Priority Data

May 14, 2015 (IN) ............. 1360/DEL/2015

(51) Int. Cl.
*G06F 17/30* (2006.01)
*H04W 4/70* (2018.01)
(Continued)

(52) U.S. Cl.
CPC .......... *H04W 4/70* (2018.02); *H04L 43/50* (2013.01); *H04W 4/005* (2013.01); *H04L 61/1541* (2013.01)

(58) Field of Classification Search
CPC ....... H04L 43/12; H04L 67/327; H04L 45/20; H04L 41/00; H04L 41/0896; H04L 41/022
(Continued)

(56) References Cited

U.S. PATENT DOCUMENTS 6,832,251 B1 * 12/2004 Gelvin ............... B60R 25/1004
709/224
7,155,639 B2 * 12/2006 Gorshenev ............... H04L 1/22
714/38.14
(Continued)

FOREIGN PATENT DOCUMENTS

WO     2013189394     12/2013

OTHER PUBLICATIONS

Nanxing Chen et al, Ensuring Interoperability for the Internet of Things: Experience with CoAP Protocol Testing, Automatika, 2013, 448-458, vol. 54, Issue—4, Beijing.

*Primary Examiner* — Frantz Coby
(74) *Attorney, Agent, or Firm* — Knobbe Martens Olson & Bear LLP

(57) ABSTRACT

The present disclosure relates to system(s) and method(s) for testing a Constrained Application Protocol (CoAP) server and a plurality of resources hosted over the CoAP server. The system is configured to identify a plurality of URI links corresponding to the plurality of resources hosted over the CoAP server, wherein each URI link from the plurality of URI links is configured to store a set of parameters associated with each resource from the plurality of resources. The 'rt' is a field to indicate type of each resource and also to distinguish between a sleeping node resource or a non-sleeping node resource. Further, a plurality of test cases configured to test the plurality of resources is generated by sending CoAP requests messages based on the set of parameters associated with the resources and the test configuration. Finally during testing the system takes into account whether a particular resource is a sleeping-node or not.

10 Claims, 3 Drawing Sheets

(51) Int. Cl.
  *H04L 12/26*    (2006.01)
  *H04W 4/00*    (2018.01)
  *H04L 29/12*    (2006.01)

(58) Field of Classification Search
  USPC ......... 709/224, 223; 370/328, 338, 332, 352
  See application file for complete search history.

(56) References Cited

U.S. PATENT DOCUMENTS

| | | |
|---|---|---|
| 8,626,893 B2 | 1/2014 | Lu et al. |
| 9,819,741 B1* | 11/2017 | Pendse .................. H04L 41/145 |
| 2004/0153772 A1* | 8/2004 | Gorshenev ................ H04L 1/22 |
| | | 714/25 |
| 2014/0282425 A1* | 9/2014 | Zhao ................... G06F 11/3688 |
| | | 717/127 |
| 2014/0359133 A1 | 12/2014 | Tian et al. |

* cited by examiner

SYSTEM AND METHOD FOR TESTING A COAP SERVER

CROSS-REFERENCE TO RELATED APPLICATIONS AND PRIORITY

The present application claims benefit from Indian Complete Patent Application No. 1360/DEL/2015, filed on May 14, 2015, the entirety of which is hereby incorporated herein by reference for all purposes.

TECHNICAL FIELD

The present disclosure in general relates to the field of testing. More particularly, the present invention relates to a system and method for testing machine to machine communication.

BACKGROUND

A Constrained Application Protocol (CoAP) is a protocol designed for internet of things and machine-to-machine applications. CoAP provides request—response based communication mechanism between a CoAP server and a set of CoAP clients. The set of CoAP clients can be in the form of sensors spread over a particular geographical area. Another example of the CoAP clients can be a network of electronic devices such as tube lights, fans, bulbs, Air Conditioners (ACs), and other electronic equipments connected over a wireless network to a central device (CoAP server). Further, all the CoAP clients may not be connected to the CoAP server at the same time, rather transmit or receive data from the CoAP server at regular intervals. This is done in order to save energy at each of the CoAP clients. However, in order to test communication between the CoAP clients and the CoAP server, one has to manually generate test cases to test the active CoAP clients in the Internet of Things (IoT) network.

Currently in order to test the CoAP server a tester needs to find out which resources are hosted on the CoAP server. This is done by manually identifying the Uniform Resource Identifiers (URIs) associated with each of the CoAP clients that are hosted over the CoAP server. Once, the URIs are determined, the URIs are fed to a load generation tool to conduct performance testing and load testing of the CoAP server and CoAP clients. However, currently there are no tools for testing CoAP server without manual input of URIs and test the CoAP clients for all possible requests.

SUMMARY

This summary is provided to introduce aspects related to systems and methods for testing CoAP server and the aspects are further described below in the detailed description. This summary is not intended to identify essential features of the claimed subject matter nor is it intended for use in determining or limiting the scope of the claimed subject matter.

In one embodiment, a method for testing a Constrained Application Protocol (CoAP) server and a plurality of resources hosted over the CoAP server is disclosed. Initially, an Internet Protocol (IP) address of the CoAP server is received by a processor. In the next step, the processor is configured to identify a plurality of Uniform Resource Identifier (URI) links corresponding to a plurality of resources hosted over the CoAP server using the IP address. Each URI link from the plurality of URI links is configured to store a set of parameters associated with each resource from the plurality of resources. The set of parameters include a Resource Type (RT) field and Interface Description (IF) field wherein the RT field indicates each resource being a sleeping-node resource or a non-sleeping node resource. Further, a plurality of test cases to test the plurality of resources is generated by the processor, wherein each test case is generated based on the set of parameters and a test configuration, wherein the test configuration is generated based on inputs received from a tester. In the next step, the processor is configured to classify the plurality of resources into non-sleeping node resources and sleeping-node resources based on the RT field associated with each resource from the plurality of resources. In the next step, the plurality of resources are tested, by the processor, using the plurality of test cases. For the purpose of testing, the test cases associated with the non-sleeping node resources are executed by generating CoAP requests to test each non-sleeping node resource. The CoAP requests are generated based on test configuration, RT field, IF field and a payload to be sent with the CoAP requests based on the IF field of the non-sleeping resources. Further, the test cases associated with the sleeping node resources are executed by generating CoAP requests to test each sleeping node resource, wherein the CoAP requests are generated based on test configuration, RT field, IF field and a payload to be sent with the CoAP requests based on IF field of the sleeping node resources, wherein the CoAP requests to test each sleeping node resource are sent multiple times with a predefined time interval in between the CoAP requests.

In one embodiment, a system for testing a Constrained Application Protocol (CoAP) server and a plurality of resources hosted over the CoAP server is disclosed. The system comprises a memory, a processor coupled to the memory, wherein the processor is configured receive an Internet Protocol (IP) address of the CoAP server. Further, the processor is configured to identify a plurality of URI links corresponding to a plurality of resources hosted over the CoAP server using the IP address. Each URI link from the plurality of URI links is configured to store a set of parameters associated with each resource from the plurality of resources. The set of parameters include a Resource Type (RT) field and Interface Description (IF) field wherein the RT field indicates each resource being a sleeping-node resource or a non-sleeping node resource. Further, a plurality of test cases to test the plurality of resources is generated by the processor, wherein each test case is generated based on the set of parameters and a test configuration, wherein the test configuration is generated based on inputs received from a tester. The processor is also configured to classify the plurality of resources into non-sleeping node resources and sleeping-node resources based on the RT field associated with each resource from the plurality of resources. Further, the plurality of resources are tested, by the processor, using the plurality of test cases. For the purpose of testing, the test cases associated with the non-sleeping node resources are executed by generating CoAP requests to test each non-sleeping node resource. The CoAP requests are generated based on test configuration, RT field, IF field and a payload to be sent with the CoAP requests based on the IF field of the non-sleeping resources. Further, the test cases associated with the sleeping node resources are executed by generating CoAP requests to test each sleeping node resource, wherein the CoAP requests are generated based on test configuration, RT field, IF field and a payload to be sent with the CoAP requests based on IF field of the sleeping node resources, wherein the CoAP requests to test each sleeping node resource are sent multiple times with a predefined time interval in between the CoAP requests.

In one embodiment, a computer program product having embodied computer program for testing a Constrained Application Protocol (CoAP) server and a plurality of resources hosted over the CoAP server is disclosed. The computer program product comprises a program code for receiving an Internet Protocol (IP) address of a CoAP server. Further, the computer program product comprises a program code for identifying a plurality of URI links corresponding to a plurality of resources hosted over the CoAP server using the IP address. Further, the computer program product comprises a program code for accepting the plurality of URI links corresponding to the plurality of resources, wherein each URI link from the plurality of URI links is configured to store a set of parameters associated with each resource from the plurality of resources. The set of parameters include a Resource Type (RT) field and Interface Description (IF) field wherein the RT field indicates each resource being a sleeping-node resource or a non-sleeping node resource. Further, the computer program product comprises a program code for generating a plurality of test cases to test the plurality of resources, wherein each test case is generated based on the set of parameters and a test configuration, wherein the test configuration is generated based on inputs received from a tester. Furthermore, the computer program product comprises a program code for classifying the plurality of resources into non-sleeping node resources and sleeping-node resources based on the RT field associated with each resource from the plurality of resources. Further, the computer program product comprises a program code for testing the plurality of resources using the plurality of test cases. For the purpose of testing, the test cases associated with the non-sleeping node resources are executed by generating CoAP requests to test each non-sleeping node resource. The CoAP requests are generated based on test configuration, RT field, IF field and a payload to be sent with the CoAP requests based on the IF field of the non-sleeping resources. Further, the test cases associated with the sleeping node resources are executed by generating CoAP requests to test each sleeping node resource, wherein the CoAP requests are generated based on test configuration, RT field, IF field and a payload to be sent with the CoAP requests based on IF field of the sleeping node resources, wherein the CoAP requests to test each sleeping node resource are sent multiple times with a predefined time interval in between the CoAP requests.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

The present disclosure relates to systems and methods for testing a Constrained Application Protocol (CoAP) server and a plurality of resources hosted over the CoAP server. The system comprises a memory, a processor coupled to the memory, wherein the processor is configured to identify a plurality of URI links corresponding to a plurality of resources hosted over the CoAP server. Each URI link from the plurality of URI links is configured to store a set of parameters associated with each resource from the plurality of resources. The set of parameters include a Resource Type (RT) field and Interface Description (IF) field wherein the RT field indicates each resource being a sleeping-node resource or a non-sleeping node resource. Further, a plurality of test cases configured to test the plurality of resources is generated by the processor, wherein each test case is generated based on the set of parameters and a test configuration, wherein the test configuration is generated based on inputs received from a tester.

The processor is also configured to classify the plurality of resources into non-sleeping node resources and sleeping-node resources based on the RT field associated with each resource from the plurality of resources. Further, the plurality of resources are tested, by the processor, using the plurality of test cases. For the purpose of testing, the test cases associated with the non-sleeping node resources are executed by generating CoAP requests to test each non-sleeping node resource. The CoAP requests are generated based on test configuration, RT field, IF field and a payload to be sent with the CoAP requests based on the IF field of the non-sleeping resources. Further, the test cases associated with the sleeping node resources are executed by generating CoAP requests to test each sleeping node resource, wherein the CoAP requests are generated based on test configuration, RT field, IF field and a payload to be sent with the CoAP requests based on IF field of the sleeping node resources, wherein the CoAP requests to test each sleeping node resource are sent multiple times with a predefined time interval in between the CoAP requests.

While aspects of described system and method for testing CoAP server and resources hosted over the CoAP server may be implemented in any number of different computing systems, environments, and/or configurations, the embodiments are described in the context of the following exemplary system.

Figure 1:
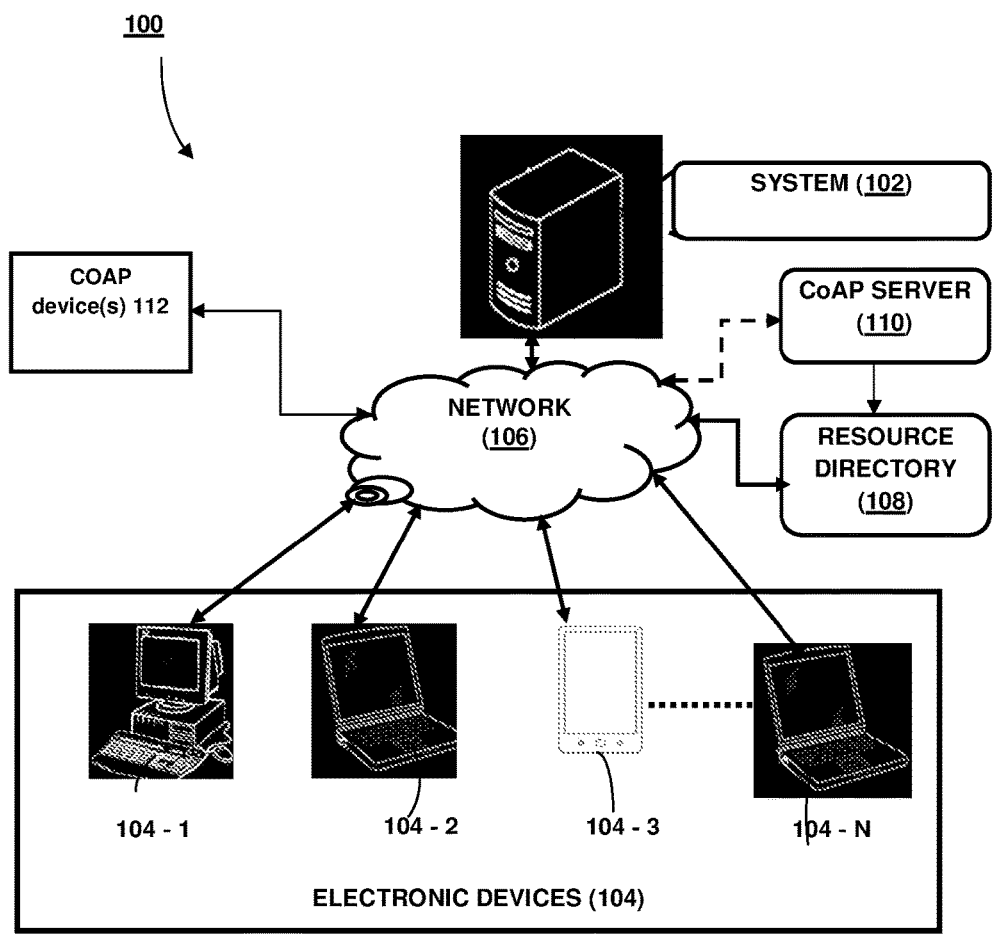
FIG. 1 illustrates a network implementation of a system for testing CoAP server, in accordance with an embodiment of the present subject matter.

Referring now to FIG. 1, a network implementation 100 of a system 102 to test the Constrained Application Protocol (CoAP) server and the plurality of resources hosted over the CoAP server. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the Internet, and the like.

The network 106 may either be a dedicated network or a shared network. The shared network represents an association of the different types of networks that use a variety of protocols, for example, Constrained Application Protocol (CoAP), Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like. Furthermore, the system 102 may be communicatively coupled with a resource directory 108 using the network 106. The COAP server 110 is further connected to COAP devices 112 over the network 106, wherein each CoAP device corresponds to a resource hosted with the CoAP server 110. The resource directory 108 is configured to store information associated with resources hosted over the CoAP server 110. In one embodiment, the resource directory 108 may be configured to store information associated with the resources hosted over more than one CoAP servers 110. The process of testing the CoAP server 110 and the plurality of resources linked with the CoAP server is explained with respect to the FIG. 2.

Figure 2:
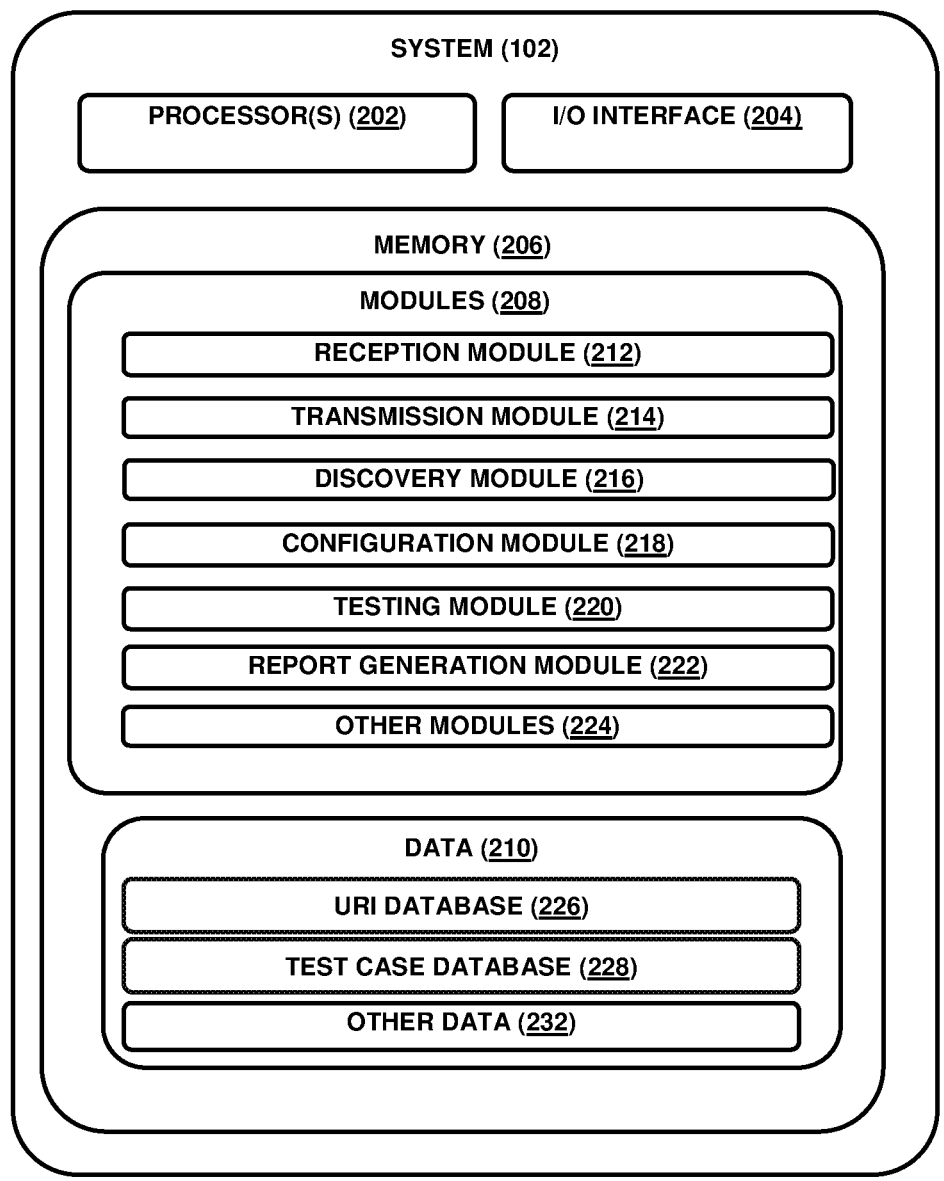
FIG. 2 illustrates the system for testing CoAP server, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types. In one implementation, the modules 208 may include a reception module 212, a transmission module 214, a discovery module 216, a configuration module 218, a testing module 220, a report generation module 222, and other modules 224. The other modules 224 may include programs or coded instructions that supplement applications and functions of the system 102.

The data 210, amongst other things, serves as a repository for storing data processed, received, and generated by one or more of the modules 208. The data 210 may also include a URI database 226, test case database 228, and other data 232. The URI database 226 is configured to store information associated with the plurality of resources, wherein the information includes URI links, set of parameters and current status associated with each resource. The test case database 228 is configured to store plurality of test cases configured to test the plurality of resources associated with the CoAP server 110. In one embodiment, the other data 232 may include data generated as a result of the execution of one or more modules in the other module 224.

In one embodiment, the reception module 212 is configured to communicate with the user devices 104 and receive an IP address of a CoAP server 110 from the user device 104. Once the IP address of the CoAP server 110 is received, the discovery module 216 identifies a plurality of resources hosted over the CoAP server 110. The plurality of resources may be discovered by the discovery module 216, by sending a GET request to the CoAP server 110, wherein the GET request is directed towards well-known relative URI "/.well-known/core". In response to the GET request from the discovery module 216, the CoAP server 110 sends a payload in a CORE link format to the discovery module 216. This payload contains URI links, hereafter referred to as URIs associated with the plurality of resources hosted by the CoAP server 110, wherein each URI stores a set of parameters associated with a resource. Further, the discovery module 216 is configured to parse URI link format from the payload and retrieve URIs associated with the plurality of resources. Once the URI's are identified, the discovery module 216 analyses each of the URIs individually and identifies a plurality of parameters associated with each resource. In one embodiment, the set of parameters include a Resource Type (RT) field and Interface Description (IF) field. The RT field indicates whether the corresponding resource is a sleeping-node resource or a non-sleeping node resource. This extracted information is then saved in the URI database 226, wherein the URI database 226 may be based on a XML schema.

Alternately, in case the IP address received from the user device 104 is that of the resource directory 108, the discovery module 216 sends a GET request to the resource directory 108, to retrieve a set of URIs associated with the resource directory, using the "/.well-known/core" link format. In this case, the resource directory 108 sends the set of URIs, wherein each URI from the set of URIs corresponds to a resource hosted on a CoAP server and contains IP address of the CoAP server from which the resource is registered with the resource directory 108. Once the IP address of each CoAP server is received, the discovery module 216 may send GET request to at least one of the CoAP servers from where resources are registered with the resource directory, in order to find plurality of resources hosted on the CoAP server that is to be tested. Further, the discovery module 216 may send a GET request to each of the CoAP servers from the set of CoAP servers, and receive a payload in a CORE link format from each of the CoAP servers. Each of the payloads contains URIs of the plurality of resources hosted by the corresponding CoAP server, wherein each URI stores a set of parameters associated with a single resource. Further, the discovery module 216 is configured to parse URI link format from the payload and retrieve URIs associated with the plurality of resources hosted over each CoAP server. Once the URIs are identified, then each of the URIs is analyzed individually and accordingly the plurality of parameters associated with each resource is identified from the corresponding URI. In one embodiment, the set of parameters include a Resource Type (RT) field and Interface Description (IF) field. The RT field indicates whether the corresponding resource is a sleeping-node resource or a non-sleeping node resource. This information is then saved in a URI database 226.

In one embodiment, once the plurality of parameters of the resources are identified from the URIs, the test configuration module 218 is configured to generate a test configuration to test each of the resources associated with the CoAP server 110 or CoAP servers. In order to generate the test configuration, the test configuration module 218 accepts inputs from a tester through the I/O interface 204. The tester may analyze the plurality of parameters associated with each of the resources and accordingly provide inputs to the test configuration module 218. The set of parameters associated with each resource from the set of resources may further include a kind of the CoAP server, a sequence of requests, a resource type, an interface type, and a number of requests handled by each resource. In one embodiment, the Test Configuration Module 218 takes test configuration as input from a tester through the I/O interface 204. This configuration is saved in an XML file format which is further used by the testing module 220 for test case generation. In one embodiment, the test configuration contains the following information:

Type of CoAP requests (GET, PUSH etc.) to be sent.
Sequence in which requests may be sent.
Resource types which needs to be tested, wherein the resource type is identified from the RT field present in the URI of the corresponding resource.
Resource Type (RT) based configuration Like any application specific payload to be sent in a request based on resource type of a resource. For e.g. PUSH luminosity value to a particular resource type of 'light'.
Interface type (IF) based configuration. Like any particular request only to be sent to a resource with an Interface Description. (For e.g. PUT request to a resource with an interface description.)
Number of clients to simulate.
Number of requests to send per client.

In one embodiment, based on the test configuration, the testing module 220 is configured to generate a plurality of test cases for testing the plurality of resources. The testing module 220 takes into account the 'RT' field value and 'IF' field (Interface Description) value of each resource and determines what requests and payloads needs to be sent to each resource for testing. Based on the requests and payloads, the testing module generates test cases to test each and every resource linked with the CoAP server. The plurality of test cases is configured to perform load testing, performance testing or application level functional testing on the plurality of resources. Further, the testing module 220 is configured to test each of the resources based on whether it's a sleeping node or non-sleeping node. For this purpose, initially the testing module 220 is configured to classify the plurality of resources into non-sleeping node resources and sleeping-node resources, based on the 'rt' field identified from the URI associated with the plurality of resources.

In the next step, the plurality of resources are tested, by the testing module 220, using the plurality of test cases. For the purpose of testing, the test cases associated with the non-sleeping node resources are executed by generating CoAP requests to test each non-sleeping node resource. The CoAP requests are generated based on test configuration, RT field, IF field and a payload to be sent with the CoAP requests based on the IF field of the non-sleeping resources.

Further, the test cases associated with the sleeping node resources are executed by generating CoAP requests to test each sleeping node resource, wherein the CoAP requests are generated based on test configuration, RT field, IF field and a payload to be sent with the CoAP requests based on IF field of the sleeping node resources, wherein the CoAP requests to test each sleeping node resource are sent multiple times with a predefined time interval in between the CoAP requests. In other words, in case the test case is executed for non-sleeping node the result of the test case is concluded based on response received or as error if no response is received. In case the test case is executed to test a sleeping-node resource and the resource fails to send any response if it is in sleeping state. If the sleeping node does not respond, the testing module 220 is configured to send 'n' numbers of requests before concluding a test result as failed.

In one embodiment, the predefined time interval between requests maybe computed based on a re-try algorithm, wherein the re-try algorithm computes the predefined delay based on exponential back-off time. This cycle of testing the sleeping-node resources is repeated based on a number of iterations specified by the tester and accordingly the test results are generated. Further, the test results for the plurality of resources associated with the CoAP server are combined by the result generation module 222 into a test report and sent to the user. The process of testing the CoAP server 110 and the plurality of resources associated with the CoAP server 110 are further explained with respect to the flowchart of FIG. 3.

Figure 3:
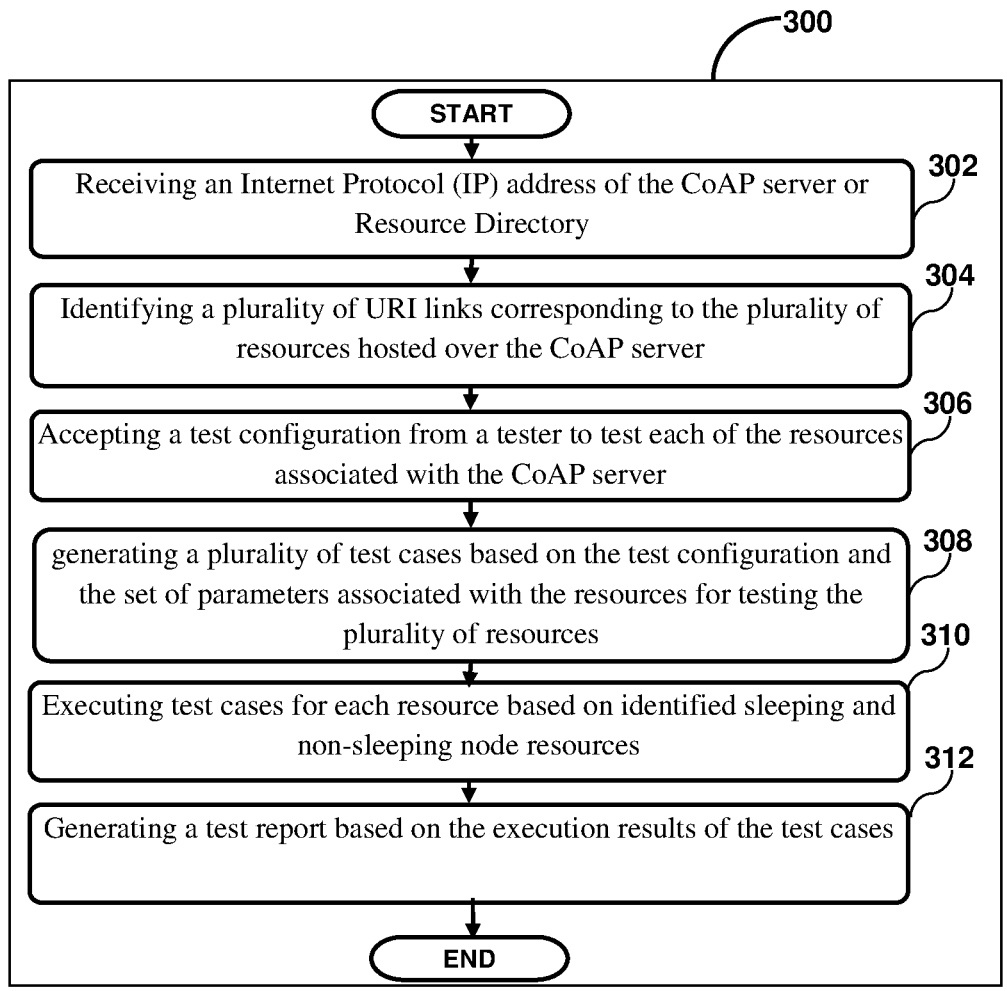
FIG. 3 illustrates a block diagram for testing CoAP server, in accordance with an embodiment of the present subject matter.

FIG. 3 represent a block diagram for testing a Constrained Application Protocol (CoAP) server and a plurality of resources hosted over the CoAP server. At block 302, the reception module 212 is configured to receive an Internet Protocol (IP) address of the CoAP server or a resource directory.

At block 304, a plurality of URI links corresponding to the plurality of resources hosted over the CoAP server are identified by the discovery module 216 using the IP address of the CoAP server 110. The plurality of resources may be discovered by the discovery module 216, by sending a GET request to the CoAP server 110 or Resource Directory 108 using the IP address. In response to the GET request, the CoAP server 110 sends a payload in a CORE link format to the discovery module 216. This payload contains URIs of the plurality of resources linked with the CoAP server 110. Each URI from the payload is configured to store a set of parameters associated with a resource from the plurality of resources. The set of parameters include a Resource Type (RT) field and Interface Description (IF) field wherein the RT field indicates each resource being a sleeping-node resource or a non-sleeping node resource. Further, the discovery module 216 is configured to parse the URI link format from the payload and retrieve URIs associated with the plurality of resources. Once the URIs are identified, the discovery module 216 analyzes each of the URIs individually to identify the plurality of parameters associated with each resource from the corresponding URI. The plurality of parameters associated with each resource is then saved in the URI database 226.

At block 306, the test configuration module 218 is configured to generate a test configuration to test each of the resources associated with the CoAP server 110. In order to generate the test configuration, the test configuration module 218 accepts inputs from a tester through the I/O interface 204. The tester may analyze the plurality of parameters associated with each of the resources and accordingly provide inputs. The test configuration module 218 is configured to analyze this inputs provided by the tester and generate a test configuration in order to test each of the resources. In an alternate embodiment, the test configuration may be directly provided by the tester using the I/O interface 204.

At block 308, once the test configuration is generated for each resource, in the next step, the testing module 220 is configured to generate a plurality of test cases for testing the plurality of resources. The test cases are configured to generate CoAP requests to test each resource. The CoAP request to test a resource is generated by taking into account test configuration to find out type of requests supported by a resource type and payload to be sent with the request based on interface description. Resource type of a resource is determined by 'rt' field of resource in URI parameters and interface description of a resource is determined by 'if' field in the URI parameters. Further, the testing module 220 is configured to test each of the resources based on the plurality of test cases.

At block 310, the testing module 220 retrieves URIs of all the resources and runs the test cases on the resources. For the purpose of testing, the test cases associated with the non-sleeping node resources are executed by generating CoAP requests to test each non-sleeping node resource. The CoAP requests are generated based on test configuration, RT field, IF field and a payload to be sent with the CoAP requests based on the IF field of the non-sleeping resources.

Further, the test cases associated with the sleeping node resources are executed by generating CoAP requests to test each sleeping node resource, wherein the CoAP requests are generated based on test configuration, RT field, IF field and a payload to be sent with the CoAP requests based on IF field of the sleeping node resources, wherein the CoAP requests to test each sleeping node resource are sent multiple times with a predefined time interval in between the CoAP requests.

At block 312, the test results are combined by the result generation module 222 into a test report and sent to the user.

Although implementations of methods and systems for testing CoAP server is disclosed, it is to be understood that the appended claims are not necessarily limited to the specific features or methods described herein. Rather, the specific features and methods are disclosed as examples of implementations for testing CoAP server.

We claim:

1. A method for testing a Constrained Application Protocol (CoAP) server and a plurality of resources hosted over the CoAP server, the method comprising:
   receiving, by a processor, an Internet Protocol (IP) address of a CoAP server;
   identifying, by the processor, a plurality of URI links corresponding to a plurality of resources hosted over the CoAP server using the IP address;
   accepting, by the processor, the plurality of URI links corresponding to the plurality of resources, wherein each URI link from the plurality of URI links is configured to store a set of parameters associated with each resource from the plurality of resources, wherein the set of parameters include a Resource Type (RT) field and Interface Description (IF) field wherein the RT field indicating each resource being a sleeping-node resource or a non-sleeping node resource;
   generating, by the processor, a plurality of test cases to test the plurality of resources, wherein each test case is generated based on the set of parameters associated with the resources and a test configuration, wherein the test configuration is generated based on inputs received from a tester;
   classifying, by the processor, the plurality of resources into non-sleeping node resources and sleeping-node resources based on the RT field; and
   testing, by the processor, the plurality of resources using the plurality of test cases, wherein the testing comprises:
      executing test cases associated with the non-sleeping node resources, by generating CoAP requests to test each non-sleeping node resource, wherein CoAP requests are generated based on test configuration, RT field, IF field and a payload to be sent with the CoAP requests based on the IF field; and
      executing test cases associated with the sleeping node resources, by generating CoAP requests to test each sleeping node resource, wherein the CoAP requests are generated based on test configuration, RT field, IF field and a payload to be sent with the CoAP requests based on IF field of the sleeping node resources, wherein the CoAP requests to test each sleeping node resource are sent multiple times with a predefined time interval in between the CoAP requests.

2. The method of claim 1, the plurality of URI links are identified by accessing the CoAP server or by accessing a resource directory, wherein the resource directory is configured to maintain the plurality of URI links corresponding to the plurality of resources.

3. The method of claim 1, wherein the plurality of test cases are configured to perform load testing, performance testing, and application level functional testing on the plurality of resources hosted on CoAP server.

4. The method of claim 1, wherein the set of parameters associated with each resource from the set of resources include a URI of the resource hosted on the CoAP server, the resource type (RT) field, an Interface Description (IF) field, and a type of requests handled by each resource.

5. The method of claim 1, wherein the predefined time interval between the CoAP requests for testing of sleeping-node resource is computed based on a re-try algorithm, wherein the retry algorithm computes the predefined delay based on exponential back-off time.

6. A system for testing a Constrained Application Protocol (CoAP) server and a plurality of resources hosted over the CoAP server, the system comprising:
   a memory;
   a processor coupled to the memory, wherein the processor is configured to perform the steps of:
      receiving an Internet Protocol (IP) address of a CoAP server;
      identifying a plurality of URI links corresponding to a plurality of resources hosted over the CoAP server using the IP address;
      accepting the plurality of URI links corresponding to the plurality of resources, wherein each URI link from the plurality of URI links is configured to store a set of parameters associated with each resource from the plurality of resources, wherein the set of parameters include a Resource Type (RT) field and Interface Description (IF) field wherein the RT field indicating each resource being a sleeping-node resource or a non-sleeping node resource;
      generating a plurality of test cases to test the plurality of resources, wherein each test case is generated based on the set of parameters associated with the resources and a test configuration, wherein the test configuration is generated based on inputs received from a tester;

classifying the plurality of resources into non-sleeping node resources and sleeping-node resources based on the RT field; and testing the plurality of resources using the plurality of test cases, wherein the testing comprises:
  executing test cases associated with the non-sleeping node resources, by generating CoAP requests to test each non-sleeping node resource, wherein CoAP requests are generated based on test configuration, RT field, IF field and a payload to be sent with the CoAP requests based on the IF field; and
  executing test cases associated with the sleeping node resources, by generating CoAP requests to test each sleeping node resource, wherein the CoAP requests are generated based on test configuration, RT field, IF field and a payload to be sent with the CoAP requests based on IF field of the sleeping node resources, wherein the CoAP requests to test each sleeping node resource are sent multiple times with a predefined time interval in between the CoAP requests.

7. The system of claim 6, the plurality of URI links are identified by accessing the CoAP server or by accessing a resource directory, wherein the resource directory is configured to maintain the plurality of URI links corresponding to the plurality of resources.

8. The system of claim 6, wherein the plurality of test cases are configured to perform load testing, performance testing, and application level functional testing on the plurality of resources hosted on CoAP server.

9. The system of claim 6, wherein the set of parameters associated with each resource from the set of resources include a URI of the resource hosted on the CoAP server, the resource type (RT) field, an Interface Description (IF) field, and a type of requests handled by each resource.

10. The system of claim 6, wherein the predefined time interval between the CoAP requests for testing of sleeping-node resource is computed based on a re-try algorithm, wherein the retry algorithm computes the predefined delay based on exponential back-off time.

* * * * *